(12) United States Patent
Hall et al.

(10) Patent No.: US 7,534,463 B1
(45) Date of Patent: May 19, 2009

(54) USE OF A NOVEL SOURCE OF FIBER FOR CAPTIVE WILD BROWSER DIETS

(75) Inventors: Mary Beth Hall, Archer, FL (US); Celeste C. Kearney, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 974 days.

(21) Appl. No.: 10/846,287

(22) Filed: May 14, 2004

Related U.S. Application Data

(60) Provisional application No. 60/471,152, filed on May 16, 2003.

(51) Int. Cl.
*A23K 1/00* (2006.01)
*A23K 1/14* (2006.01)

(52) U.S. Cl. .................. 426/635; 426/807

(58) Field of Classification Search ............ 426/635, 426/807
See application file for complete search history.

(56) References Cited

U.S. PATENT DOCUMENTS

| | | | | |
|---|---|---|---|---|
| 3,946,115 | A | * | 3/1976 | Brever et al. ............ 426/72 |
| 3,988,480 | A | | 10/1976 | Ames et al. |
| 4,112,069 | A | * | 9/1978 | Huber ................ 424/93.4 |
| 4,166,867 | A | * | 9/1979 | Betz et al. ............ 426/73 |
| 4,171,385 | A | | 10/1979 | Skoch et al. |
| 4,172,148 | A | | 10/1979 | Hauck et al. |
| 4,186,212 | A | | 1/1980 | Howell |
| 4,321,278 | A | | 3/1982 | Johanning et al. |
| 5,908,634 | A | | 6/1999 | Kemp et al. |
| 6,017,564 | A | | 1/2000 | Owens et al. |
| 6,207,217 | B1 | | 3/2001 | Peoples et al. |
| 6,299,913 | B1 | | 10/2001 | Block et al. |

OTHER PUBLICATIONS

David J. Baer et al. Feed selection and digestibility by captive giraffe. Zoo Biology, vol. 4, Issue 1 , pp. 57-64, 1985.*
Stephen T. Blezinger, Some By-Product Feeds can be used to add Extra Fiber. downloaded from archived internet files: http://www.cattle.today.com/archive/2003/March/CT257.shtml dated Apr. 24, 2003, 6 pages.*
Harris et al. By-product Roughage Feedstuffs for Dairy Cattle 1, published Aug. 1991, University of Florida IFAS Extension, 3 pages.*
Barney Harris, Jr. The importance of Fiber in Feeding Dairy Cattle, Sep. 1992, Florida Cooperative Extension Service Fact Sheet DS 40 of Dairy Production Guide, 4 pages.*
Clauss, M. et al. "Digestive Tract Pathology of Captive Giraffe (*Giraffa camelopardalis*): a Unifying Hypothesis" *Proceedings of European Association of Zoo and Wildlife Veterinarians (EAZWV)*, 4th Scientific Meeting, May 8-12, 2002, Heidelberg, Germany.

* cited by examiner

*Primary Examiner*—C. Sayala
(74) *Attorney, Agent, or Firm*—Saliwanchik, Lloyd & Saliwanchik

(57) ABSTRACT

The subject invention provides unique feeds for non-domesticated captive wild browsers, including zoo animals. Compositions of the subject invention provide fiber having a structure that is particularly advantageous for captive browsers and the like. The subject invention surprisingly provides cottonseed hulls as a preferred feed for captive browsers. This source of fiber is also provided in an amount that is effective for treating (or preventing) acidosis and similar digestive disorders in captive browsers. These compositions and the methods disclosed herein surprisingly provide a very simple and economical solution to preventing and treating acidosis and the like in such animals.

18 Claims, 4 Drawing Sheets

US 7,534,463 B1

USE OF A NOVEL SOURCE OF FIBER FOR CAPTIVE WILD BROWSER DIETS

CROSS-REFERENCE TO A RELATED APPLICATION

The present application claims the benefit of U.S. Provisional Application Ser. No. 60/471,152, filed May 16, 2003, which is hereby incorporated by reference herein in its entirety, including any figures, tables, nucleic acid sequences, amino acid sequences, or drawings.

FIELD OF THE INVENTION

The subject invention relates to feed for non-domesticated captive wild browsers, including zoo animals.

BACKGROUND OF THE INVENTION

Various additives have been used in animal feed in attempts to enhance the nutritional value of the feed. U.S. Pat. No. 6,207,217 relates to animal nutrition compositions that include a polyhydroxyalkanoate (PHA) for improving the metabolizable energy content of the feed. This patent teaches that PHA can be accumulated in corn or an oilseed and that a plant part comprising the PHA can be fed to livestock for the animal industry. U.S. Pat. No. 4,186,212 relates to "Animal feed containing high molecular weight aliphatic alcohols" to enhance metabolic energy available in a ruminant diet. Steers are exemplified. U.S. Pat. No. 4,172,148, relating to ruminant feeds, relates to the use of cellulosic roughage together with trichloroethyl esters of essential amino acids. Sheeps are the exemplified animals. U.S. Pat. No. 4,171,385 relates to animal feed blocks containing a fiber source and magnesium oxide (so that the feed can be made in block form). Heifers are exemplified.

Despite painstaking efforts and care, many current diets used by (and commercially available to) zoos often do not exactly match the natural diets of wild browsers and other herbivores. The use of commonly available feeds, although healthful to domestic livestock, can cause zoo animals to develop health disorders such as ruminal acidosis and, possibly, peracute mortality syndrome.

Problems such as ruminal acidosis are not limited to zoo animals. Even domesticated animals such as cows can experience such problems, and various attempts have been made to treat such conditions. For example, U.S. Pat. No. 6,017,564, entitled "Treatment of stressed animals with dihydroxyquinoline compounds," relates to treating sick ruminants by administering this compound with a ration. Heifers are exemplified. U.S. Pat. No. 4,112,069, entitled "Treatment of ruminants," relates to the administration of the microorganism *Peptococcus asaccharolyticus* together with a ration or feed.

The art mentions that some amount of cottonseed can be included as one of many components in some domesticated animal feeds. U.S. Pat. No. 4,321,278, for example, shows cotton seed hulls as one of several components in sheep food, but that patent relates to increasing the protein content of such feed by chlorination and ammoniation. U.S. Pat. No. 5,908,634 relates to domesticated animal feed containing molasses, bentonite, and zeolite. Cottonseed and various other meals can be used there as the source of solvent extracted and extruded protein. Hay and various other components can be included with those feeds. U.S. Pat. No. 3,988,480 relates to acetic-acid treated protein meals for animals such as sheep. Because of the acid treatment, these feeds are said to resist microbial breakdown in the rumen. Cottonseed and various other meals can be used as the initial protein source to be acid treated according to that invention. U.S. Pat. No. 6,299,913 relates to a feedstock for improving the lactational performance of dairy cows. Cottonseed meal can be included as one component of the feeds, but an essential feature of those feeds are certain cations and anions in specified ratios.

However, the art as discussed above does not suggest that cottonseed hulls (without an "active ingredient") could be used to improve digestive function and thus cure ruminal acidosis and other digestive ailments. The art actually teaches against this, as some other active ingredient is included, in many of the above embodiments, to alleviate acidosis. Furthermore, the art did not show or suggest that cottonseed hulls could be used as feed for zoo animals, and the art certainly did not show or suggest that cottonseed hulls, as a simple feed, could be used to improve digestive function to treat or prevent ruminal acidosis and the like in zoo animals.

There are several commercially available feeds for zoo animals. One example is MAZURI diets from PURINA. Some of these diets are intended for consumption by primates and llamas, for example. A diet called OMNIVORE ZOO FEED "A" comprises ground soybean hulls. Some other commercially available diets even include wood in their feed, but that is not provided explicitly for physical form needs.

This illustrates that wild browsers have natural diets, feeding behaviors, and related morphologies and physiologies that differ substantially from domesticated animals. Cows and other grazers were bred and raised to eat grass, hay, corn, and the like. On the other hand, typical non-domesticated browsers naturally prefer to eat leafy tissues, fresh flowers, and other like plant parts, over grass plants and grains. Thus, feeds and possible treatments for sick domesticated animals cannot be readily applied to captive browsers made ill because of inappropriate diet composition and physical form. In addition, many of these treatments, some of which might be mentioned above, attempt to treat symptoms, but they do not address the root cause of the illness.

The art does acknowledge that hay and concentrated supplements might cause digestive problems in animals that do not naturally eat hay. For example, Clauss et al. observed that grass and hay are typically broken down into long, fiber-like particles that form a "fibrous raft" in the rumen of a grazer, while browse is typically broken down into polygonal particles that cannot form a fibrous raft. Clauss, M., M. Lechner-Doll, E. J. Flach, J. Wisser, and J. M. Hatt (2002), "Digestive tract pathology of captive giraffe (*Giraffa camelopardalis*): an unifying hypothesis," in *Proceedings of European Association of Zoo and Wildlife Veterinarians (EAZWV)*, 4$^{th}$ Scientific Meeting, May 8-12, 2002, Heidelberg, Germany. Clauss et al. also observed that captive giraffes had lower food intakes when fed only hay and a pelleted diet, as compared to those offered additional browse or linseed/flaxseed extraction chips. However, the art has yet to offer a practical, economical solution to these problems. It can be understood that much more time, money, and resources have been devoted to developing diets and treatments for domesticated animals because of the great financial implications dietary problems and the like can have in the beef industry, for example. However, much less is currently known about the exact nutritional needs of zoo animals and how to meet these needs in a practical, economical manner.

BRIEF SUMMARY OF THE INVENTION

The subject invention provides unique feeds for non-domesticated captive wild browsers, including zoo animals. Compositions of the subject invention provide fiber having a structure that is particularly advantageous for captive herbivores and the like. The subject invention surprisingly provides cottonseed hulls as a preferred feed for captive herbivores. This source of fiber is also provided in an amount that is effective for treating (or preventing) acidosis (in microbial fermentation compartments of the gut) and other diet-related animal health impairments of captive herbivores. These compositions and the methods disclosed herein surprisingly provide a very simple and economical solution to preventing and treating acidosis and other diet-related health impairments in captive herbivores. The subject invention can likewise enhance the nutritional status of such animals. The compositions and feeding methods of the subject invention can also be used to, for example, increase lactation in browsers that are nursing.

The ability of the subject compositions to improve the status of severely compromised animals suffering from diet-related illnesses, where all other treatments and diets failed, is especially surprising. The surprising nature of the subject invention is further illustrated in part by the lack of commercially available feeds that offer dietary elements such as fiber having a structure like that provided by the subject compositions. There are essentially no currently available alternatives or substitutes. This illustrates the long felt need for what this invention provides. The subject invention offers nutritionists a tool not already used in diet formulations of captive browsers to enhance gut function, and thereby digestion and health of the animals.

DETAILED DESCRIPTION OF THE INVENTION

Figure 1:
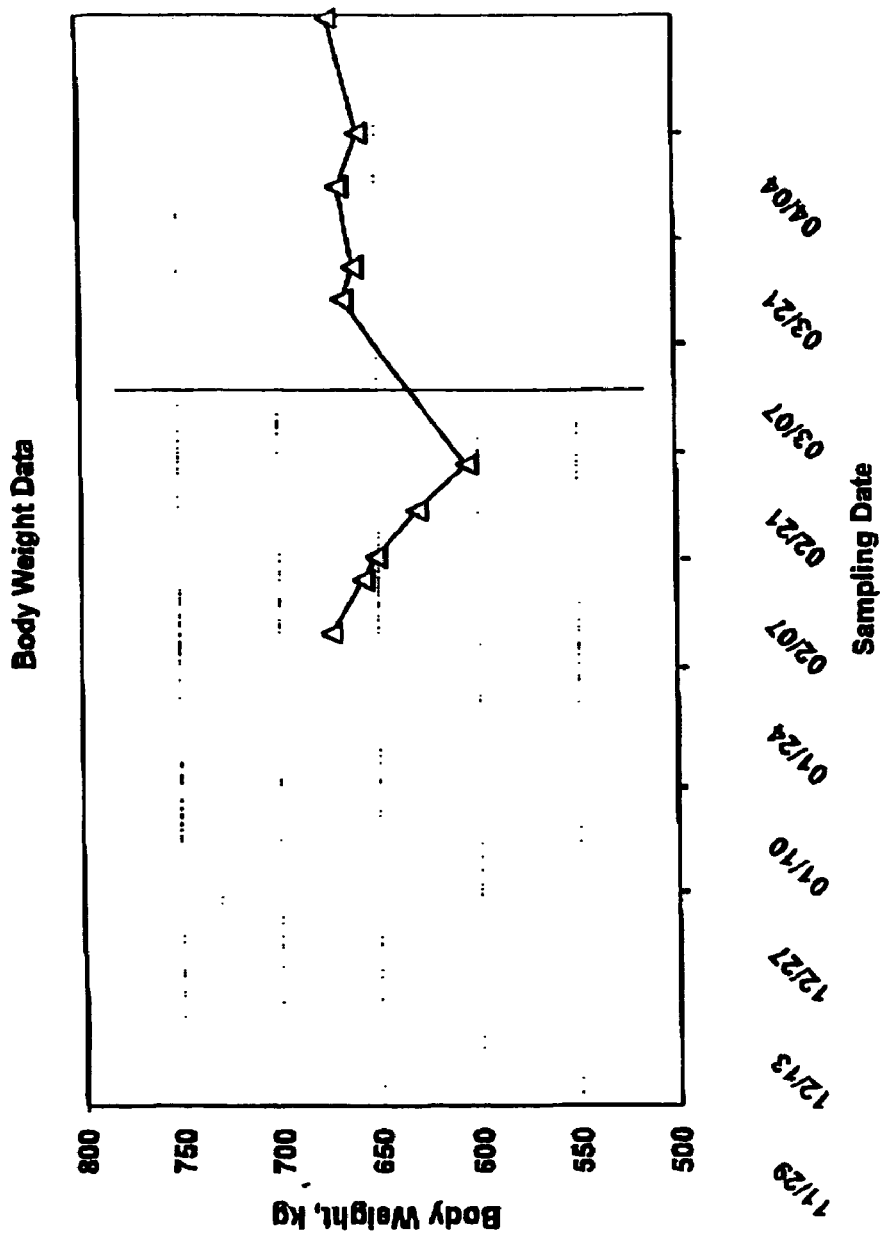
FIGS. 1-4 show the results of blood tests before and after the initiation of feeding the supplement.

The subject invention provides improvements for animal welfare, particularly for animals in captivity. This has readily apparent ethical implications. This invention also has economic implications. Decreased animal health drains personnel and monetary resources to care for sick animals. Premature death of browsers can result in significant economic losses. While it is difficult to put a dollar amount on life, obtaining a single giraffe, for example, can cost in the range of $30,000.

The subject invention provides unique feeds for non-domesticated captive wild browsers, including zoo animals. Compositions of the subject invention provide fiber having a structure that is particularly advantageous for captive browsers and the like. The subject invention surprisingly provides cottonseed hulls as a preferred feed for captive browsers. This source of fiber is also provided in an amount that is effective for treating (or preventing) acidosis (in microbial fermentation compartments of the gut) and other diet-related animal health impairments of captive browsers. These compositions and the methods disclosed herein surprisingly provide a very simple solution to preventing and treating acidosis and other diet-related health impairments in captive browsers. The subject invention can likewise enhance the nutritional status of such animals. The compositions and feeding methods of the subject invention can also be used to, for example, increase lactation in browsers that are nursing.

The ability of the subject compositions to improve the status of severely compromised animals suffering from diet-related illnesses, where all other treatments and diets failed, is almost miraculous. The surprising nature of the subject invention is further illustrated in part by the lack of commercially available feeds that offer dietary elements such as fiber having a structure like that provided by the compositions described below. There are essentially no currently available alternatives or substitutes. This illustrates the long felt need for what this invention provides.

The subject invention offers nutritionists a tool not already used in diet formulations of captive browsers to enhance rumen function, and thereby digestion and health of the animals. The subject invention provides a unique diet for non-domesticated captive wild browsers, including zoo animals.

One important aspect of this invention was the recognition that cottonseed hulls provide fiber of the right structure and in a sufficient amount to captive browsers, and that cottonseed hulls can be used to treat and prevent acidosis and other diet-related health impairments in such animals. Compositions of the subject invention provide fiber having a structure that is particularly advantageous for captive browsers and the like. These compositions and the methods disclosed herein surprisingly provide a very simple solution to preventing and treating acidosis and other diet-related health impairments in such animals.

It was presently found that cottonseed hulls provide not only an acceptable, but also a highly advantageous source of fiber to captive browsers and the like, and that the feeds of the subject invention can be used to improve the health status of severely compromised animals suffering from diet-related illnesses. As part of the subject invention, cottonseed hulls were identified as an ideal source of polygonal fiber, which is similar in structure to that of leaves and other natural dietary sources. Based on the present observations, it appears that the fiber provided by the subject invention behaves much differently in the digestive tract of wild browsers than the fiber that is found in hay. Cottonseed hulls have unique physical and digestive qualities that set them apart from other fiber sources that could be supplied in captive browser diets. However, these advantageous qualities of, and uses for, cottonseed hulls were not heretofore recognized. The physical form and amount of the fiber provided by the subject invention, and its effect in the diet, can enhance the energy status of animals, apparently by improving rumen function.

Cottonseed hulls are of an advantageous size and shape, and they provide an advantageous blend of digestible and indigestible fractions. The subject invention economically provides fiber of a structure (having a polygonal shape) that more closely matches the natural diets of non-domesticated captive wild browsers, including zoo animals (which naturally eat leaves as opposed to hays commonly fed to domestic livestock; hay is longer and needle- or straw-shaped). It appears that the fiber provided by the subject invention tends to be moved from the rumen rather than being retained there, which is the tendency of the long fiber particles of hay. Thus, the use of cottonseed hulls as described herein was surprisingly found to enhance overall nutritional status and accordingly improve the health of browsers.

Compositions of the subject invention can be used for treating health disorders related to the physical form and carbohydrate composition of the previous diet, or they can be incorporated with the regular diets of the animals as a preventative measure. Thus, the subject invention preferably includes a method of treating a captive browser suffering from acidosis or other digestive ailment by feeding/administering to the animal an effective amount of cottonseed hulls so that the symptoms of said acidosis or other ailment are reduced due to the consumption of the cottonseed hulls. The art did not teach or suggest that administering cottonseed hulls alone would cure acidosis. There was no suggestion or motivation that this type of feed could be used as a palliative for acidosis; there was certainly no expectation that this would work.

The subject invention also includes methods of providing a diet for improving or maintaining good overall animal health, including methods for preventing acidosis and the like in a captive browser. These methods comprise feeding a captive browser an effective amount of cottonseed hulls so as to prevent acidosis and/or the onset of symptoms that precede and/or are associated with acidosis and other like digestive problems, whereby acidosis and/or associated symptoms are prevented due to the consumption of the cottonseed hulls. Such methods can also be used to improve or maintain the animal's overall health. These methods can also be used to, for example, increase lactation in animals that are nursing their offspring.

In preferred embodiments, cottonseed hulls are used substantially apart from the "meat" of whole cottonseeds. Such compositions were not used (and were not expected to be usable) in the manners now disclosed. Thus, the subject invention includes the use of substantially meat-free cottonseed hulls. However, it should be noted that following standard procedures for removing the meat (which is used for other purposes, such as for oil extraction), batches of cottonseed hulls may contain some "contaminating" meats and cottonseed meal. This "contamination" obtained using typical preparation methods is insubstantial. Thus, compositions of the subject invention are substantially (or completely) free of whole cottonseeds.

Compositions of the subject invention can preferably (and surprisingly advantageously) be fed to giraffes, okapi, kudu, eland, gerenuk and other antelope species, gazelles of various species, including Mhorr's and addra gazelles, as well as cervids, including but not limited to white-tailed (and other) deer. The subject compositions can also be fed (surprisingly advantageously) to non-ruminants such as rhinos (black and other browsing rhinos) and equid species.

The ingredients or components of compositions of the subject invention can be adjusted for each particular use. For example, with compositions of the subject invention that have a mixture of cottonseed hulls together with other ingredients, such compositions will typically comprise preferably between about 5% and about 30% of the cottonseed hull supplement mixed with standard (commercially available) feedstuffs. However, animals can be fed a composition comprising, for example, more than 30% cottonseed hull. Other forage and browse can still be made available to the animals, although no other specific feed is necessary. Starch is preferably limited (less than 10%, more preferably less than 5%, still more preferably less than 2%, and can be less than 1%).

According to the subject invention, an additional "active ingredient" is surprisingly not needed for treating acidosis and other diet-related health disorders. The advantages of this are apparent in light of this disclosure. The cottonseed hulls, and the fiber they provide, are essentially the "active ingredient" of the subject invention. Compositions of the subject invention can be free from any other digestive aids or "active ingredients" per se, such as dihydroxyquinoline, high molecular weight aliphatic alcohols, and the microorganism *Peptococcus asaccharolyticus*. Thus, some embodiments of the subject invention can be said to "consist essentially of" cottonseed hulls.

Methods and compositions of the subject can be used to enhance rumen function and improve diet digestibility and animal health. This can reduce the loss of captive browsers due to death from diet-related disorders. The subject invention can reduce the cost of feedstuffs to zoological parks and preserves. For example, this will allow the possibility of browser diets to be manufactured by local feedmills. Animal welfare and management concerns can thereby be addressed.

All patents, patent applications, provisional applications, and publications referred to or cited herein are incorporated by reference in their entirety to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLE 1

Treatment of Compromised Animal

The subject invention stems in part from the surprisingly successful "treatment" of a giraffe apparently suffering from a diet-related disorder wherein the treatment comprised feeding a cottonseed hull-based feed to the giraffe. The other foodstuff the giraffe had been offered contained similar feeds (beet pulp, sucrose, molasses, soybean meal, etc.) with the exception of the cottonseed hulls. This treatment quickly led to the giraffe's surprising recovery.

Before the initiation of this treatment, the health of this giraffe was severely compromised. All other avenues for treatment were exhausted by her veterinarians and caretakers. This giraffe was fed a diet according to the subject invention (the exemplified mixture comprised, on an as-fed basis, 15.4% cottonseed hulls, 10.3% alfalfa hay, 25.6% beet pulp, 10.3% sucrose (table sugar), 7.7% Soyplus (heat-treated soybean meal), 5.1% molasses, 18.0% 48% protein soybean meal, 5.1% dairy mineral, and 2.6% calcium carbonate). Following this treatment, the giraffe exhibited a marked turnaround in health and nutritional status. She gained 150 pounds (roughly 10% of her bodyweight). See FIG. 1. Prior to treatment, her weight had been steadily declining. Following treatment, the giraffe also showed evidence of a decrease in her inflammatory response, her hematocrit increased to normal levels, and her blood glucose declined to normal levels for ruminants.

Figure 2:
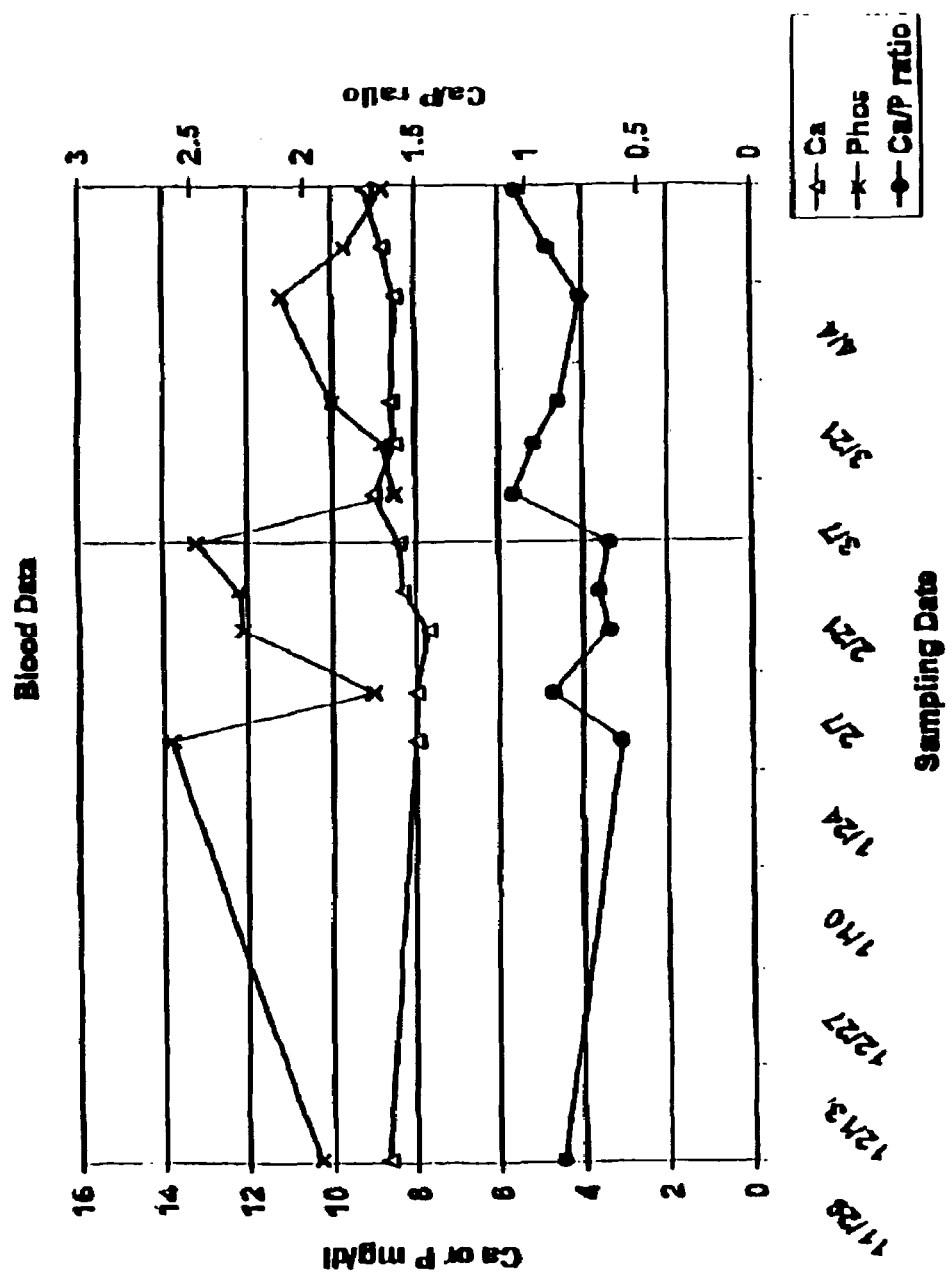
Figure 3:
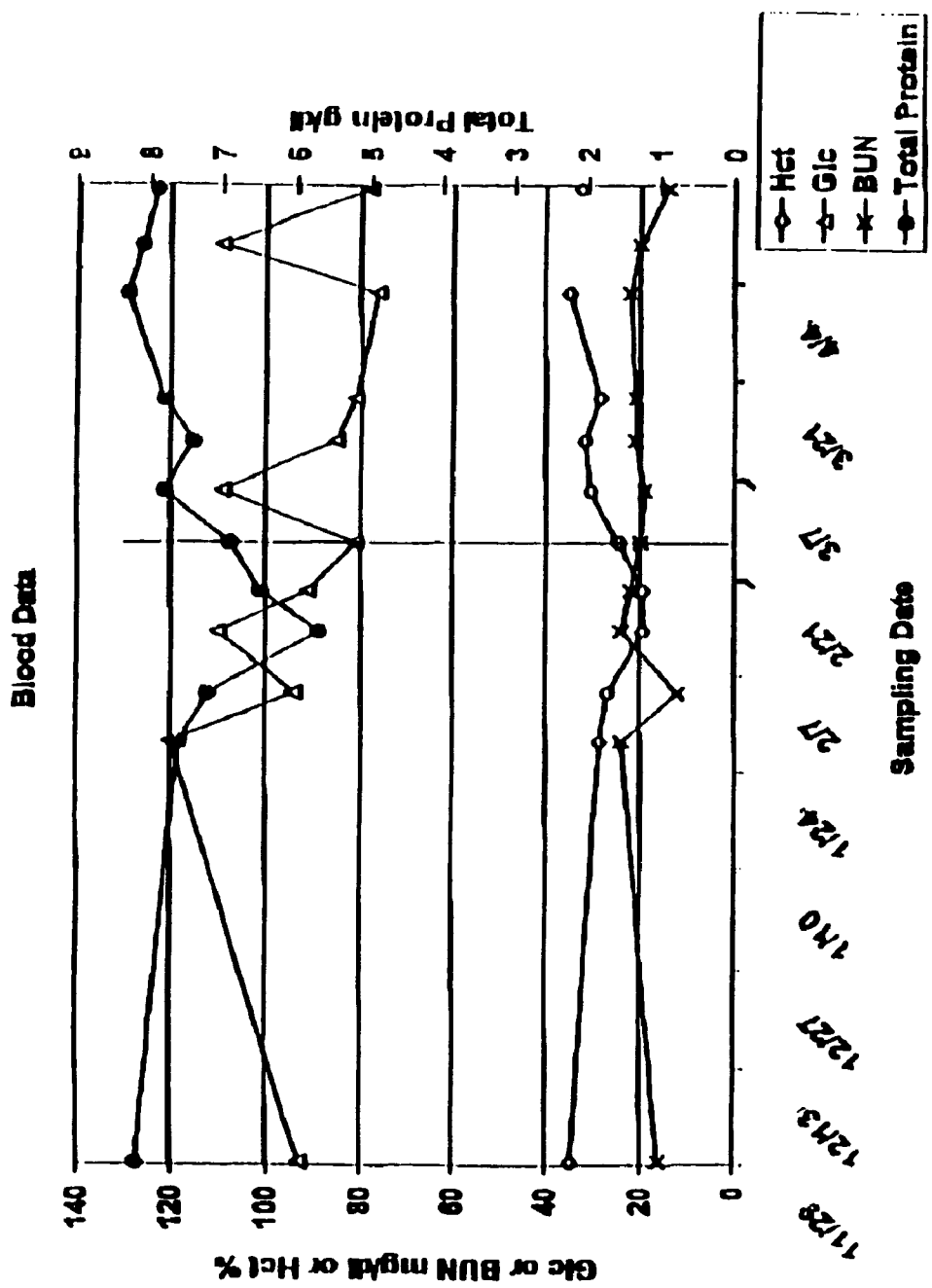
Figure 4:
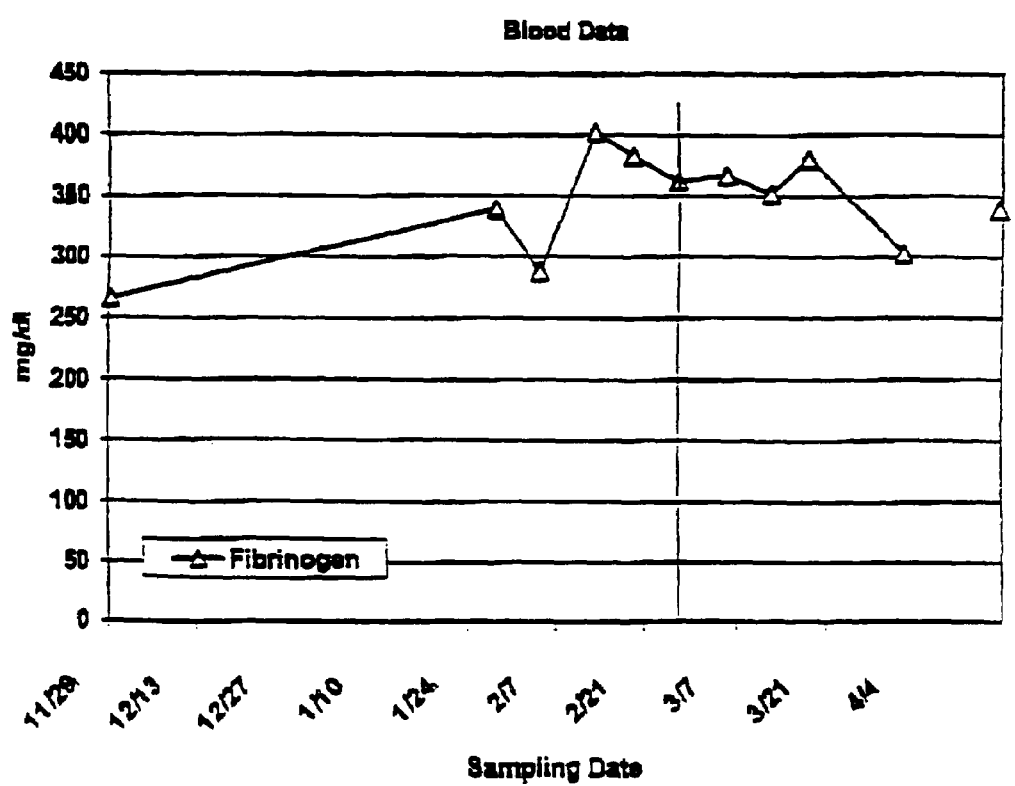

Data present in FIGS. 2-4 suggest that the cottonseed hull-containing feed improved gut function and digestion, and the amount of nutrients available for the normal function of the animal. As can be seen on FIGS. 1-4, feeding of the diet to the giraffe began on February 26. On March 5, she looked as well as could have been expected. The manure was tighter and there was no further weight loss; she felt less bony in the spine of her scapula. Her PCV was up to 30 and her calcium/phosphate (ca/p) ratio reverted to a near normal ratio; this giraffe had not exhibited such levels for quite some time. The overall improvement was very surprising, and the change in the ca/p ratio on just one week was extremely surprising in the absence of a pellets diet. Higher calcium readings were also remarkable. Her glucose continued to decline from an average of 98.2 mg/dl to 89.7 mg/dl, which is closer to the normal average reported for domesticated ruminants. It is not normal for giraffe and other ruminants to have blood levels of phosphorus greater than calcium. Consumption of the new supplement by this compromised animal resulted in the giraffe's blood calcium-to-phosphorus ratio returning to more desirable ranges.

EXAMPLE 2

Feeding to Increase Lactation

Use of the feed was also made with two giraffe cows that had recently calved. With the healthy lactating giraffe that had giraffe calves suckling, the day after the new feed was offered to the cows, the calves had looser stool, which gradually firmed up over the next few days. (In cattle, a calf's stool will commonly become looser when the calf is fed more milk, and its stool firms up as the calf adapts to consuming the greater amount of milk.) The consensus: of veterinarians working with the giraffe calves was that the giraffe cows produced more milk when consuming the cottonseed hull-based feed.

EXAMPLE 3

Feeding for Maintaining and Improving Animal Health

In a controlled research study (a modified reversal study, with seven periods and six giraffe), animals were offered the cottonseed hull-based feed or a blend of commercially available feeds (MAZURI BROWSER BREEDER plus PURINA OMELENE 200 in a 75:25 ratio). The animals were offered free choice supplement, alfalfa hay, water, and salt. Diets were formulated to have equivalent protein, vitamin, and mineral compositions. In each 21-day period, the animals were offered one of the supplements. Body weight, intake of each of the feeds, and behavior over a 48-hour period were recorded, and single blood samples taken on day 21 of each period were analyzed for a variety of blood analytes.

In this controlled study with healthy animals, blood glucose declined to levels more normal for ruminants in animals provided with the cottonseed hull diet (82.3 mg/dl) as compared to the commercial diet (99.0 mg/dl; P=0.028). Blood urea nitrogen was numerically lower on the new diet (16.6 mg/dl) as compared to the commercial diet (20.6 mg/dl; P=0.166), suggesting that the new diet allowed more efficient capture of dietary protein for the animals' use, and less breakdown of and loss of dietary or body protein. Total feed intake tended to be greater on the cottonseed hull-based diet (1.43% of body weight) than on the commercial diet (1.34% of body weight; P=0.128) giving an additional route for this palatable feedstuff to provide more nutrients to meet the animals' nutrient requirements. Surprisingly, but apparently related to the positive impact of the cottonseed hull-based diet, animal behavior differed between diets. For the new diet vs. commercial diets (respectively), animals on the new diet spent more time consuming the supplement (277 vs. 121 minutes/48 hr; P=0.064), although animals on both diets spent the same time consuming hay (254 vs. 239 minutes/48 hr; P=0.762). Animals on the new diet tended to spend more time in both rumination and eating (1224 vs. 953 minutes/48 hr; P=0.124). The increased amount of time in rumination and eating could allow for better rumen function through production of more saliva to buffer and maintain a more neutral pH in the rumen. The results of this controlled experiment indicate that the cottonseed hull-based supplement differs from the commercially available supplement in ways having apparent advantages to the "treated" animals.

The invention claimed is:

1. A method of improving digestive function in a non-domesticated captive wild browser animal wherein said method comprises feeding to said animal a feed composition comprising an active ingredient that improves digestive function in the animal, wherein said active ingredient consists of an effective amount of cottonseed hulls, whereby digestive function is improved due to consumption of said cottonseed hulls by said animal, and wherein said animal is selected from the group consisting of giraffes, okapi, kudu, eland, gerenuk, antelopes gazelles, cervids, deer, rhinos, and equid species.

2. The method of claim 1 wherein said animal has impaired nutritional status prior to said feeding.

3. A method of maintaining normal digestive function in a non-domesticated captive wild browser animal wherein said method comprises feeding to said animal a feed composition comprising an active ingredient that maintains normal digestive function in the animal, wherein said active ingredient consists of an effective amount of cottonseed hulls, whereby normal digestive function is maintained due to consumption of said cottonseed hulls by said animal, and wherein said animal is selected from the group consisting of giraffes, okapi, kudu, eland, gerenuk, antelopes, gazelles, cervids, deer, rhinos, and equid species.

4. The method of claim 3 wherein said method is used to prevent development of impaired nutritional status in said animal.

5. The method of claim 2 wherein said method restores normal digestive function in said captive browser animal.

6. A method for increasing lactation by a lactating, non-domesticated captive wild browser animal wherein said method comprises feeding to said animal a feed composition comprising an active ingredient that increases lactation by the animal, wherein said active ingredient consists of an effective amount of cottonseed hulls, and wherein said animal is selected from the group consisting of giraffes, okapi, kudu, eland, gerenuk, antelopes, gazelles, cervids, deer, rhinos, and equid species.

7. The method of claim 1 wherein said animal is a giraffe.

8. The method of claim 3 wherein said animal is a giraffe.

9. The method of claim 6 wherein said animal is a giraffe.

10. The method of claim 1 wherein said cottonseed hulls are present in a composition comprising between about 5% and about 30% of the cottonseed hulls without an additional active ingredient.

11. The method of claim 3 wherein said cottonseed hulls are present in a composition comprising between about 5% and about 30% of the cottonseed hulls without an additional active ingredient.

12. The method of claim 6 wherein said cottonseed hulls are present in a composition comprising between about 5% and about 30% of the cottonseed hulls without an additional active ingredient.

13. The method of claim 1 wherein said feed composition consists essentially of the active ingredient, wherein the active ingredient is substantially meat-free cottonseed hulls.

14. The method of claim 13 wherein said composition comprises less than 2% starch.

15. The method of claim 3 wherein said feed composition consists essentially of the active ingredient, wherein the active ingredient is substantially cottonseed-meat-free cottonseed hulls.

16. The method of claim 15 wherein said composition comprises less than 2% starch.

17. The method of claim 6 wherein said feed composition consists essentially of the active ingredient, wherein the active ingredient is substantially meat-free cottonseed hulls.

18. The method of claim 17 wherein said composition comprises less than 2% starch.

* * * * *

UNITED STATES PATENT AND TRADEMARK OFFICE
CERTIFICATE OF CORRECTION

PATENT NO. : 7,534,463 B1
APPLICATION NO. : 10/846287
DATED : May 19, 2009
INVENTOR(S) : Mary Beth Hall and Celeste C. Kearney It is certified that error appears in the above-identified patent and that said Letters Patent is hereby corrected as shown below:

Column 7
Line 60, "antelopes gazelles, cervids" should read -- antelopes, gazelles, cervids --

Signed and Sealed this

Fourth Day of August, 2009

JOHN DOLL
*Acting Director of the United States Patent and Trademark Office*